No. 12,360. REISSUED JUNE 20, 1905.

W. I. FOLLETT.

TIME STAMP.

APPLICATION FILED MAY 13, 1905.

3 SHEETS—SHEET 1.

WITNESSES:

A. R. Appleman

L. F. Browning

INVENTOR

Wilbur I. Follett

BY his ATTORNEY

Edward A. Davidson

PHOTO-LITHOGRAPHED BY SACKETT & WILHELMS LITHG. & PTG. CO. NEW YORK.

No. 12,360. REISSUED JUNE 20, 1905.

W. I. FOLLETT.

TIME STAMP.

APPLICATION FILED MAY 13, 1905.

3 SHEETS—SHEET 2.

WITNESSES:

S. R. Spellman

L. F. Browning

INVENTOR

Wilbur I. Follett

BY his ATTORNEY

Edward C. Davidson

PHOTO-LITHOGRAPHED BY SACKETT & WILHELMS LITHO. & PT'G. CO. NEW YORK.

No. 12,360. REISSUED JUNE 20, 1905.

W. I. FOLLETT.

TIME STAMP.

APPLICATION FILED MAY 13, 1905.

3 SHEETS—SHEET 3.

WITNESSES:

A. R. Appleman

L. F. Browning

INVENTOR

Wilbur I. Follett

BY his ATTORNEY

Edward C. Davidson

PHOTO-LITHOGRAPHED BY SACKETT & WILHELMS LITHO. & PTG. CO. NEW YORK.

No. 12,360. Reissued June 20, 1905.

UNITED STATES PATENT OFFICE.

WILBUR I. FOLLETT, OF NEW YORK, N. Y.

TIME-STAMP.

SPECIFICATION forming part of Reissued Letters Patent No. 12,360, dated June 20, 1905.

Original No. 777,890, dated December 20, 1904. Application for reissue filed May 13, 1905. Serial No. 260,350.

*To all whom it may concern:*

Be it known that I, WILBUR I. FOLLETT, a citizen of the United States, residing in the borough of Brooklyn, city of New York, and State of New York, formerly of Mendham, county of Morris, State of New Jersey, have invented certain new and useful Improvements in Time-Stamps, of which the following is a specification.

The objects of this invention are to improve and cheapen the construction of apparatus of this class, to make it accurate and certain in its operation, and while providing for protection of the time-movement or clock-train from the shocks and jars incident to the use of the time-stamp to positively control the hour, minute, and meridian wheels by the clock-train. Other organizations of the prior art have had the same objects in view, and this invention comprises improved organizations hereinafter set forth and claimed.

Figure 1:
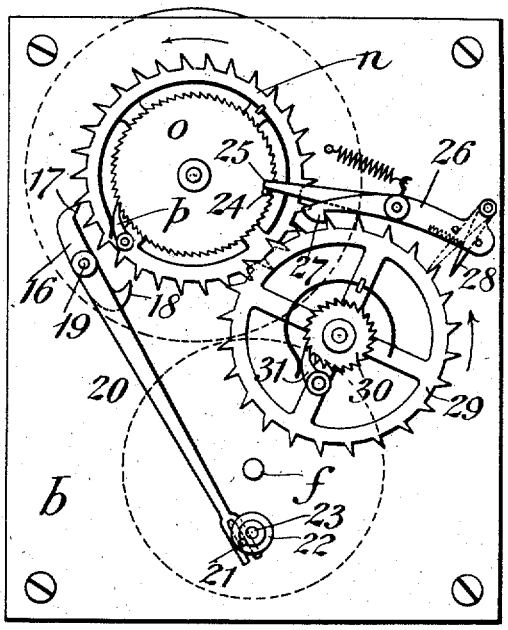
Figure 2:
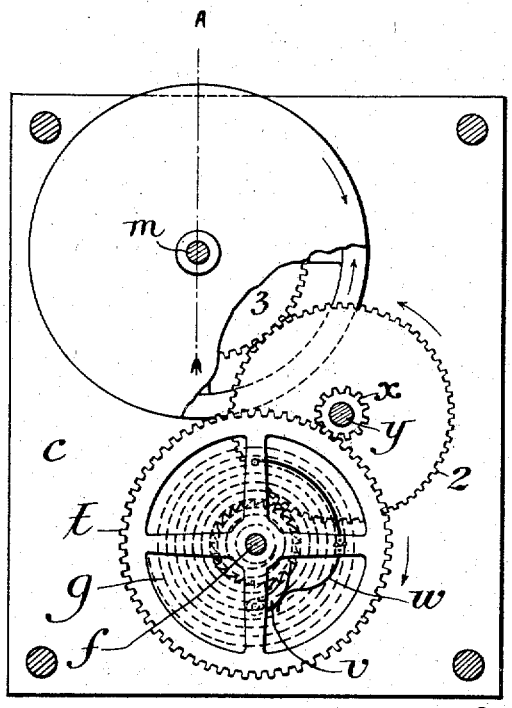
Figure 4:
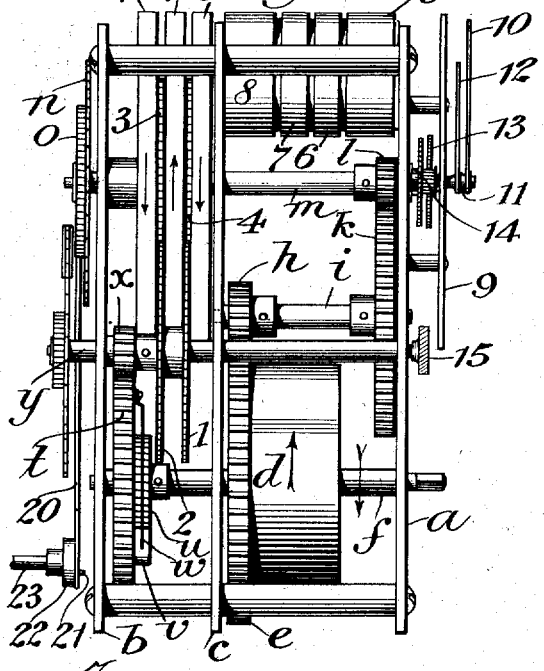
Figure 3:
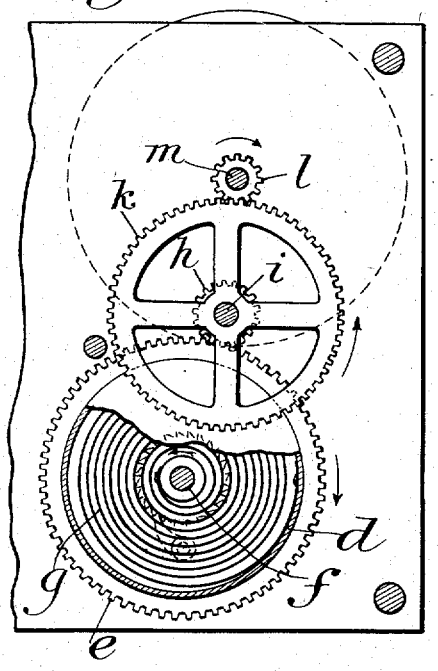
Figure 5:
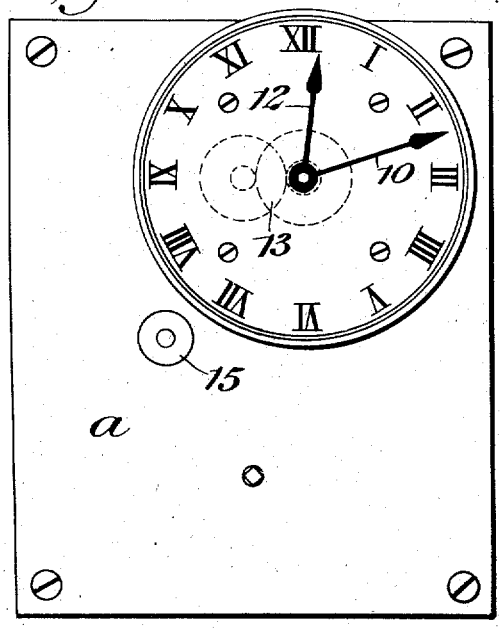
Figure 9:
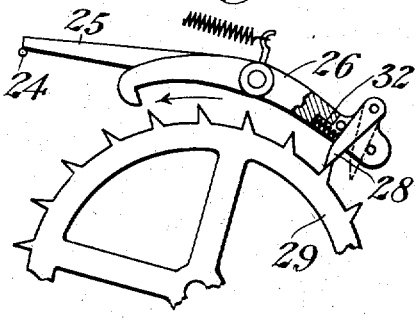
Figure 6:
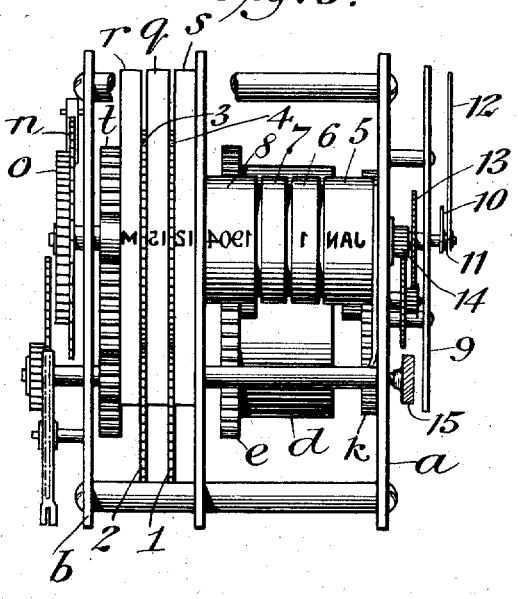
Figure 7:
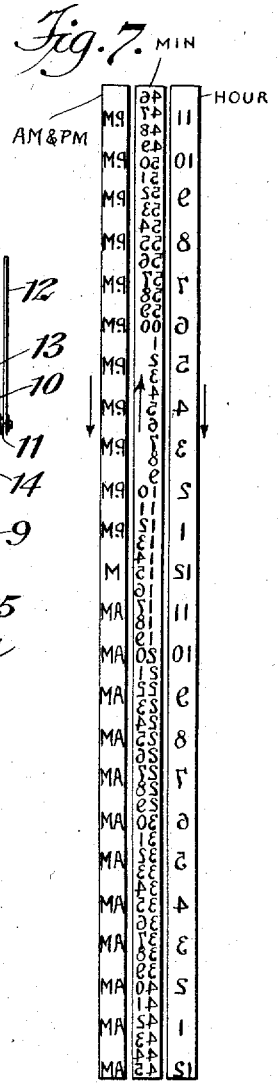
Figure 8:
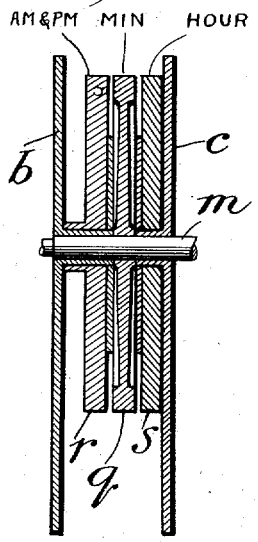

In the accompanying drawings, Figure 1 is a rear elevation; Fig. 2, an elevation from the rear with the rear plate and parts in front thereof removed; Fig. 3, a front elevation with the front plate removed; Fig. 4, a side elevation; Fig. 5, a front elevation; Fig. 6, a plan view. Fig. 7 shows a development of the hour, minute, and meridian wheels. Fig. 8 is a section on the line A A of Fig. 2, and Fig. 9 is an enlarged detailed view of the escapement of the hour-wheel.

This time-stamp mechanism is to be inclosed in a suitable casing provided with an appropriate platen and die-plate and the ordinary rotating part or parts containing special words, such as "Received," "Answered," &c.; but these several features have not been illustrated, as they are common and well known, and illustration thereof would only tend to multiplication of sheets of drawings.

As shown, the frame comprises a front plate *a*, a rear plate *b*, and an intermediate plate *c*, all connected by suitable posts or transverse rods and serving for the supports and bearings of the various parts. A spring-barrel *d*, having at one side a gear *e*, surrounds a winding post or shaft *f* and contains a flat coiled spring *g*, one end of which is attached to the shaft *f* and the other to the drum, Fig. 3. The reaction of the spring thereof tends to impart rotation to the shaft *f* in one direction and to the drum *d* in the reverse direction. The gear *e* meshes with a pinion *h* on a shaft *i*, carrying a larger gear *k*, that meshes with a pinion *l* on the minute-shaft *m* of the time-stamp device. On the rear end of the shaft *m* is loosely mounted the toothed escapement-wheel *n*, and also fast on this end of the shaft in juxtaposition to the escapement-wheel is the ratchet-wheel *o*, engaged by the spring-controlled pawl *p*, pivoted on the side of the escapement-wheel, the arrangement being such as to permit rotation of the shaft and ratchet-wheel in one direction independently of the escapement-wheel *n*. The minute-wheel *q* is fast on the shaft *m*, and alongside of it, mounted as hereinafter described, are the meridian-wheel *r* and the hour-wheel *s*.

The shaft *f*, to which the inner end of the coiled mainspring is connected, is rotated in the direction indicated by the arrow and has loosely mounted upon its rear end the gear-wheel *t* and adjacent to it and fast on the shaft *f* a ratchet-wheel *u*, engaged by a pawl *v*, pivoted on the side of the gear *t* and pressed against the ratchet by a spring *w*. This is an ordinary winding arrangement. The gear *t* meshes with the pinion *x* on a shaft *y*, having also fast upon it two gear-wheels *z* and 1, which engage gears 3 4, attached to the sides of the meridian and hour wheels *r s*, Figs. 4 and 8. The meridian-wheel *r* is mounted upon a hub projecting from the inner face of the back plate *b*, while the hour-wheel is mounted upon a similar hub projecting from the rear face of the intermediate plate *c*. The minute-wheel shaft *m* of the time-stamp passes through both of these hubs, and between them is located the minute-wheel *q*, fixed on the shaft *m*. The meridian and hour wheels are therefore separately driven, but from the same end of the mainspring, whose reaction rotates the drum *d*, and the minute-wheel is separately driven from the same mainspring, the inner end of which effects rotation of the shaft *f*. As indicated by the arrows, the meridian and hour wheels revolve in one direction and the minute-wheel in the opposite direction. As shown in Fig. 7, the hour-wheel is provided with numerals from "1" to "12" and from "1" to "12" again. The meridian-wheel is provided with meridian-letters "A. M.," "P M.," and "M.," there being one such provision of meridian-letters for each numeral on the hour-wheel opposite which they are respectively arranged.

On a suitable shaft extending between the front plate *a* and the intermediate plate *c* are mounted the month-wheel 5, the two day-wheels 6 7, and the year-wheel 8. These wheels are to be provided with the usual detent or bank pawls working in toothed wheels at their sides and may be operated by hand when required or otherwise, as may be desired. Since the characters they must carry are few in number, they are preferably made of much smaller diameter than the hour, minute, and meridian wheels.

At the front concentric with the minute-wheel shaft *m* is the usual clock-face 9, at the end of the minute-wheel shaft is the minute-hand 10, and on the bushing 11, surrounding the end of this shaft, is the hour-hand 12. The bushing frictionally embraces the shaft and carries a gear 13, connected through a gear and pinion on a short stud-shaft with a pinion 14 on the shaft *m*, this being the ordinary train for driving the hour-hand. The front end of the shaft *y* is provided with a thumb-piece 15, by which it may be rotated to simultanously set the hour and meridian wheels. The minute-wheel may be set by rotation of the minute-hand 10.

The clock-movement designed to be inclosed in the casing of this apparatus (which, however, is not shown) is to be located at the rear of the mechanism described and is to directly control the minute-wheel escapement. The teeth of the minute escapement-wheel *n* are inclined on the rear side and on the front or leading side are straight in radial lines extending from the axis. This is the preferred construction. The escapement-lever 16 has the usual pallets 17 18 at its ends that engage the teeth of the minute escapement-wheel and is mounted on a rock-shaft 19, from which projects a downward-extending arm 20, forked or slotted at its lower end, and in the fork or slot of which works a pin 21 in the face of a part or wheel 22, that is rotated once in every two minutes by the clock-train, which is not shown, except that in Fig. 4 the shaft 23, driven by the clock-train, is indicated. The rotation of the shaft 23 and wheel 21 serves to carry the downwardly-extending arm 20 to the right—for instance, as viewed in Fig. 1—until the upper pallet of the escapement disengages the tooth of the wheel, the lower pallet then catching the adjacent tooth in the rear thereof, so that the minute-wheel is advanced but one step. Continued rotation of the part or wheel 22 finally carries the arm 20 to the left, permitting the lower pallet of the escapement-lever to disengage a tooth of the wheel, whereupon the upper pallet catches the next tooth adjacent to it, the wheel having again moved but one step.

Projecting from the face of the ratchet-wheel *o* on the rear end of the minute-wheel shaft *m* is a pin 24, that comes against the tail 25 of a pivoted escapement-lever 26, having pallets 27 28, that engage the teeth of the hour escapement-wheel 29, loosely mounted on the rear end of the shaft *y* and connected with the shaft through a ratchet-wheel 30, fixed on the end of the shaft and engaged by a spring-pressed pawl 31, pivoted on the side of the escapement-wheel. The depth of the pallet 27 is such that when the pin 24 lifts it by acting on the tailpiece 25 as the minute-wheel comes into position to print "59" the pallet is not quite lifted out of engagement with the tooth against which it lies, and consequently as the minute-wheel comes into position to print "60" or "00" the further movement of the pin 24 serves to disengage pallet 27 from the tooth of the wheel. The work of lifting the pallet 27 through the desired range of movement is divided between the two steps of the minute-wheel in turning up to "59" and "60" or "00." The other pallet of the escapement-lever 26 is pivoted and controlled by coil or other spring 32, so that when the pallet 27 disengages the wheel the spring-pallet 28 is sufficiently advanced to catch the tooth traveling toward it and yields sufficiently to permit such rotation of the escapement-wheel as to permit the passage of a single tooth on each actuation of the escapement-lever, which occurs once in each revolution of the minute-wheel.

Experience has demonstrated that the organization above described is a practical and efficient one for accomplishing the ends sought by this invention. The construction may, however, be varied in detail by those skilled in such matters without departure from the invention.

I claim as my invention—

1. In a time-stamp, the combination of a driven minute-printing wheel, its shaft, its escapement-wheel loosely mounted on the shaft, a ratchet-wheel fixed on the shaft, a pawl connecting the escapement-wheel and the ratchet-wheel for simultaneous rotation in one direction, a driven hour-printing wheel, its escapement-wheel, a toothed escapement-lever coöperating with the escapement-wheel of the minute-printing wheel, a time-actuated part that positively actuates said escapement-lever, a toothed escapement-lever coöperating with the escapement-wheel of the hour-printing wheel, and a projection on the ratchet-wheel of the minute-printing wheel adapted once in each revolution thereof to trip the escapement-lever of the hour-wheel.

2. In a time-stamp, the combination of the minute-printing wheel, a ratchet-wheel in fixed relation thereto, an escapement-wheel positively connected with the ratchet-wheels to rotate in one direction only therewith, an hour-printing wheel, a ratchet-wheel in fixed relation thereto, the escapement-wheel of the hour-printing wheel mounted to loosely rotate and positively connected with the ratchet-wheel to rotate therewith in one direction only, a time-controlled mechanism coöperating with the two escapement-wheels, a clock-face, having hour and minute hands, an operative connection between the minute-hand and the minute-printing wheel by which the latter may be set by the former, and a shaft for setting the hour-printing wheel.

3. In a time-stamp, the combination with the driven minute-printing wheel, its escapement-wheel, and an independent spring-drum whose reaction tends constantly to rotate both wheels, of a toothed escapement-lever coöperating with the escapement-wheel of the minute-printing wheel and a part driven by a clock-train operatively connected with the escapement-lever by a sliding crank connection to rock it positively in both directions.

4. In a time-stamp, the combination with the driven minute-printing wheel, its escapement-wheel and an independent spring-drum whose reaction tends constantly to rotate both wheels, of a toothed escapement-lever coöperating with the escapement-wheel of the minute-printing wheel and an arm projecting therefrom having a slot in its end, and a crank-pin working in said slot and actuated by a clock-train.

5. In a time-stamp, the combination with a driven minute-printing wheel, its escapement-wheel, and an independent spring-drum whose reaction tends constantly to rotate both wheels, of a toothed escapement-lever coöperating with said escapement-wheel and having a slotted extension, and a crank-pin engaging said slot and rotated by a clock-train once in every two minutes, whereby the escapement-lever is positively actuated each minute but in opposite directions.

6. In a time-stamp, the combination of a driven minute-printing wheel, its escapement-wheel, a driven hour-printing wheel, its escapement-wheel, a toothed escapement-lever coöperating with the escapement-wheel of the minute-printing wheel, a time-driven part positively actuating said escapement-lever, a toothed escapement-lever coöperating with the escapement-wheel of the hour-printing wheel, and means whereby the latter escapement-lever is actuated once in each revolution of the minute-printing wheel.

7. In a time-stamp, the combination of a driven minute-printing wheel, a driven hour-printing wheel, their escapement-wheels, a toothed escapement-lever coöperating with the minute escapement-wheel, a time-actuated part actuating said escapement-lever in both directions, an escapement-lever for the hour escapement-wheel, having two teeth, one fixed and the other pivoted for the purpose described, and means whereby the latter escapement-lever is tripped or moved once in each revolution of the minute-printing wheel.

8. In a time-stamp, the combination of the frame, hour and meridian printing wheels, opposite concentric separate hollow bearings for each of said wheels rigidly secured to the frame, a minute-wheel shaft extending through said hollow bearings, a minute-printing wheel fixed to the shaft and located between the hour and meridian wheels, and means for intermittently rotating the three wheels.

9. In a time-stamp, the combination of the hour and meridian printing wheels, separated hollow bearings upon which they rotate, a minute-printing wheel, a driving-mainspring, driving devices connecting one end of the spring with the hour and meridian wheels and driving devices connecting the other end of the spring with the minute-wheel, whereby the reaction of the spring at both of its ends tends to drive the minute-wheel in one direction and the hour and the meridian wheels in the other direction.

10. In a time-stamp, the combination of a rotatable printing-wheel, a rotatable ratchet-wheel in fixed relation thereto, an escapement-wheel loosely mounted concentrically to said ratchet-wheel, a connection between the ratchet-wheel and escapement-wheel by which the ratchet-wheel is driven positively in one direction with the escapement-wheel, and time-controlled escapement mechanism coöperating with the escapement-wheel.

In testimony whereof I have hereunto subscribed my name.

WILBUR I. FOLLETT.

Witnesses:
L. F. Browning,
E. F. Wicks.